United States Patent [19]
Belt et al.

[11] Patent Number: 6,029,213
[45] Date of Patent: Feb. 22, 2000

[54] AUTOMATIC IR PORT DETECTION AND SWITCHING

[75] Inventors: Steve Belt, Pflugerville; John Pate, Austin; Greg Hudgins, Austin, all of Tex.

[73] Assignee: Dell U.S.A. L.P., Roundrock, Tex.

[21] Appl. No.: 09/060,735

[22] Filed: Apr. 15, 1998

[51] Int. Cl.[7] .................................................. G06F 13/00
[52] U.S. Cl. .............................. 710/72; 710/10; 710/62; 359/154; 359/155
[58] Field of Search ........................... 710/8–12, 62–64, 710/72–74; 359/154–155; 488/39

[56] References Cited

U.S. PATENT DOCUMENTS

| | | | |
|---|---|---|---|
| 5,465,038 | 11/1995 | Register . | |
| 5,676,567 | 10/1997 | Gluskoter et al. . | |
| 5,781,177 | 7/1998 | Helot et al. | 345/156 |
| 5,786,921 | 7/1998 | Wang et al. | 359/152 |
| 5,894,425 | 4/1999 | Saliba | 711/154 |
| 5,906,657 | 5/1999 | Ognazzini | 709/248 |

*Primary Examiner*—Christopher B. Shin
*Attorney, Agent, or Firm*—Haynes and Boone, LLP

[57] ABSTRACT

An automatic IR port detection device is provided in a portable computer including a first and a second transceiver data port. An external device is adjacent the computer and includes at least one external transceiver data port. An IR port detection and scanning program in the computer is actuated by an initiating key combination. A controller in the computer generates a systems management interrupt in response to the initiating key combination being actuated. An IR scan timer is initiated in response to the systems management interrupt being generated. A system BIOS in the computer actuates the first transceiver data port to scan for an external IR signal and sequentially actuates the second transceiver data port to scan for the external IR signal in response to the absence of the external IR signal received by the first transceiver data port. The IR scan timer is resettable in the absence of the IR signal being received from the external transceiver data port by either of the first and second transceiver data ports.

20 Claims, 3 Drawing Sheets

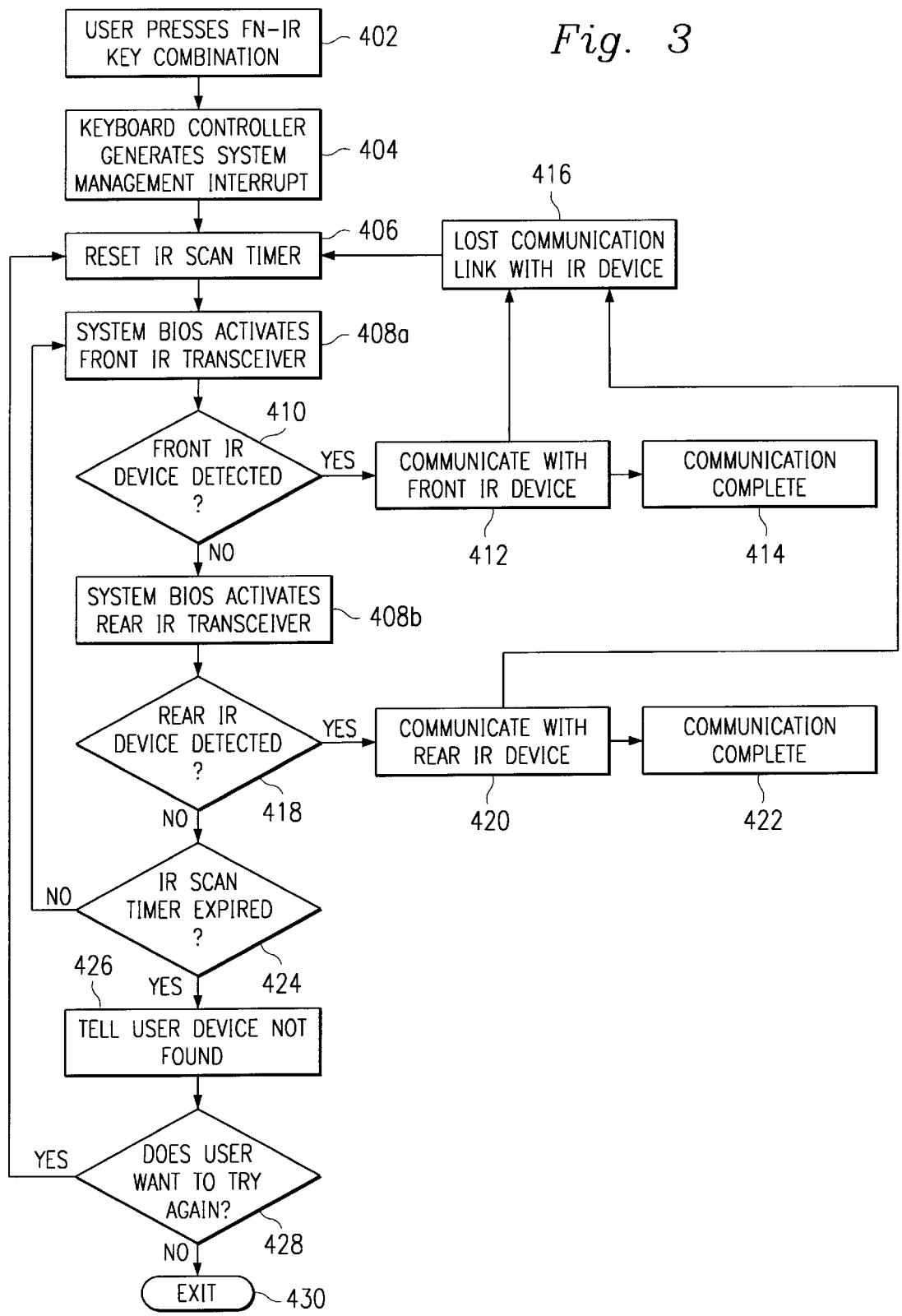

AUTOMATIC IR PORT DETECTION AND SWITCHING

BACKGROUND

The disclosures herein relate generally to portable computers and more particularly to the use of infra-red (IR) data ports used in such computers.

In recent years, the Infra-Red Data Association (IrDA) was formed by a consortium of technology companies who put together specifications on how to communicate with a computer or other electronic device through an infra-red data connection. The convenience of such a communication mode is that it permits two devices to communicate without any wires. Almost every notebook computer on the market has by now adopted IR communication via an IR data port provided in the computer housing.

More recently, several manufacturers have provided notebook computers with more than one IR data port because of the many ways in which the IR communication mode is used. Typically, two such ports are provided, but a system is not limited to two ports. For example, users use their notebook computers to communicate with their desktop computers to synchronize files between the two machines. Previously, this was done via cable hook-ups which are much less convenient than the wireless communication offered through the use of IR. Typically, a first or rear mounted IR port on the notebook computer is positioned in front of the IR port mounted on the front of the desktop computer. The IR ports of both machines are aligned since IR is wireless, line-of-sight communication. Therefore, the IR ports must be within close proximity and pointed toward one another to establish communications.

In addition to synchronizing files between the desktop and notebook units, additional uses have come along. Personal electronic appointment devices (PDA's) are used to store phone numbers and appointment schedules. Although notebook computers are useable for keeping phone numbers and appointment schedules, many notebook users also carry lightweight PDA devices. Therefore, users commonly transfer data stored in their PDA's to their notebook computers and vice versa. To accomplish this, the PDA is typically placed in front of or beside the notebook computer in alignment with a second one of the notebook IR data ports which may be mounted on the front or side of the notebook computer. Many printers, projectors and desktop PC's have IR data ports allowing wireless printing or data transfer with portables. This scenario creates a problem of designating which one of the IR data ports should establish the wireless link communicating with the other devices because a technological limitation of the IR data port architecture is that only a single port can be made active at any given time.

In determining which port is to be designated to communicate with an external device at any given time, the system in the notebook computer can be set up in a user friendly manner to continuously search back and forth between the two ports to find out which device to communicate with. This is undesirable because it uses a lot of power which can cause an unwanted drain on the battery power of the notebook computer. Another problem with the looking back and forth scenario is that there may be communications received by both ports, i.e., a communication with one IR port from the PDA and another communication with the other IR port from the desktop computer. In this situation, the notebook does not have a way of knowing which device to talk to. Software can be used to direct the notebook as to which device to talk to but the software must be user friendly. After all, wireless communication is supposed to be simpler and therefore it is counterproductive to confuse a simple approach with software that is not user friendly. Present systems are difficult and confusing. It is difficult to determine when connection is made, i.e., users must first determine which port is enabled. If it is desired to change the enabled IR port to the other port location, a utility is brought up and the user chooses, e.g., the front port for presentations, or the back port for data transfer or printing. After the port change is made, the user is required to reboot the notebook computer. The utility is again brought up and the user can then communicate with the external IR device.

Therefore, what is needed is an apparatus and method which provide automatic IR data port detection, switching and selection without requiring the user to reboot each time a port change is desired and which does not cause an undesirable drain on battery power stored in the notebook computer.

SUMMARY

One embodiment, accordingly, provides an apparatus and a method whereby a portable notebook computer continually scans via multiple IR ports for an IR signal. When an IR signal is detected, the port which detects the IR signal, locks on the signal and establishes communications with an external device which generated the IR signal. To this end, an automatic port detection device comprises a portable computer including a first and a second transceiver data port. An IR port detection and scanning program is provided in the portable computer and is actuated by an initiating key or key combination. A controller in the portable computer generates a systems management interrupt in response to the keyboard command being actuated. An IR scan timer is initiated in response to the systems management interrupt being generated. The system BIOS in the computer actuates the first transceiver data port to scan for an external IR signal, and sequentially actuates the second transceiver data port to scan for an external IR signal in response to the absence of an external IR signal received by the first transceiver data port. The IR scan timer is resettable in the absence of an IR signal being received by the second transceiver data port.

A principal advantage of this embodiment is that the plurality of IR data ports on the portable notebook computer can sequentially, automatically scan an external IR data port for an IR signal. The user is only required to locate one of the several ports adjacent the external IR data port. If an IR signal is being generated by the external data port, the IR data port on the portable computer which is adjacent the external IR data port, will eventually lock on to the external IR signal. Once the external IR signal is detected by a data port, communication is established and searching ceases. The scan timer limits the scan time to conserve battery power in the portable computer.

BRIEF DESCRIPTION OF THE DRAWINGS

FIG. 3 is a diagrammatic view illustrating an embodiment of a flow chart for a dual IR scanning apparatus and method.

DETAILED DESCRIPTION OF THE PREFERRED EMBODIMENT

Figure 1:
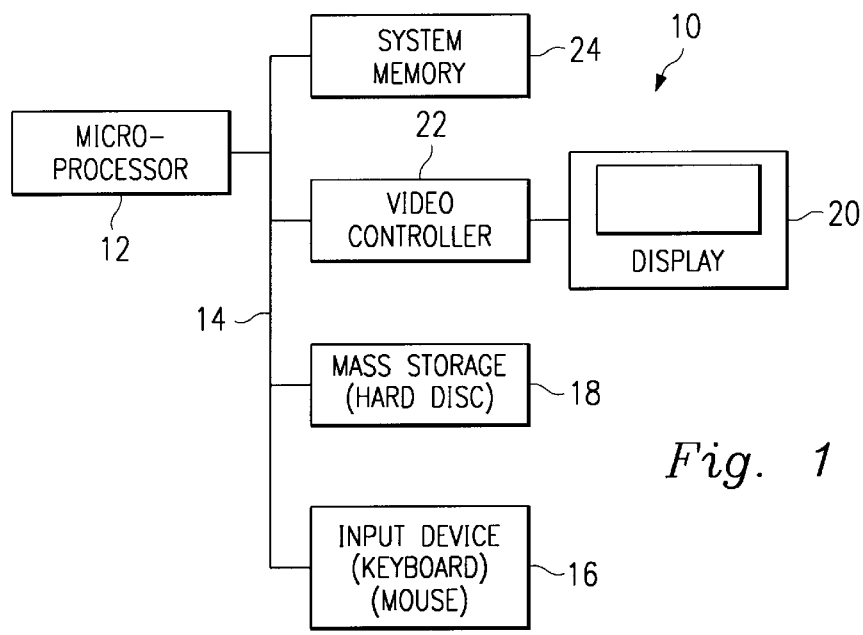
FIG. 1 is a diagrammatic view illustrating an embodiment of a typical computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 10 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2A:
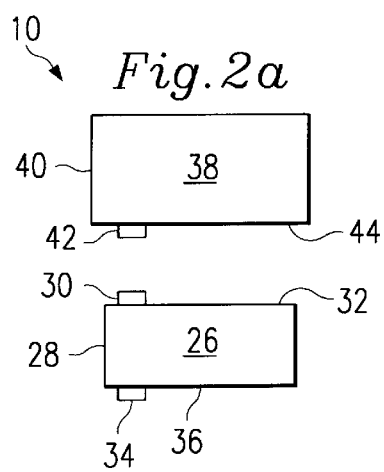
FIGS. 2a–2d are diagrammatic top views illustrating an embodiment of a portable computer and several external devices.

Computer system 10 is self-contained in a portable laptop or notebook computer 26, FIG. 2a. Notebook computer 26 is contained in a housing 28 and in the example illustrated in FIG. 2a, includes a first IR data port 30 mounted on a rear surface 32 of housing 28, and also includes a second IR data port 34 mounted on a front surface 36 of housing 28. Notebook computer 26 is mounted adjacent a printer 38 which includes a housing 40 and an IR port 42 mounted on a front surface 44 of housing 40. Front surface 44 of printer 38 is in close proximity to rear surface 32 of notebook computer 26 to permit IR signal communication between IR port 30 of notebook computer 26 and IR port 42 of printer 38.

Figure 2B:
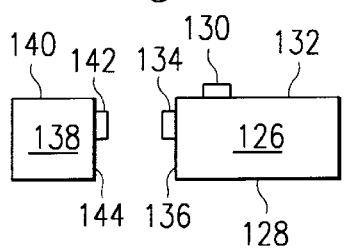

In another example, notebook computer 126, FIG. 2b, is contained in a housing 128 and includes a first IR data port 130 mounted on a rear surface 132 of housing 128, and also includes a second IR data port 134 mounted on a side surface 136 of housing 128. Notebook computer 126 is mounted adjacent a PDA device 138 (discussed above) which includes a housing 140 and an IR port 142 mounted on a rear surface 144 of housing 140. Rear surface 144 of PDA device 138 is in close proximity to side surface 136 of notebook computer 126 to permit IR signal communication between IR port 134 of notebook computer 126 and IR port 142 of PDA device 138.

Figure 2C:
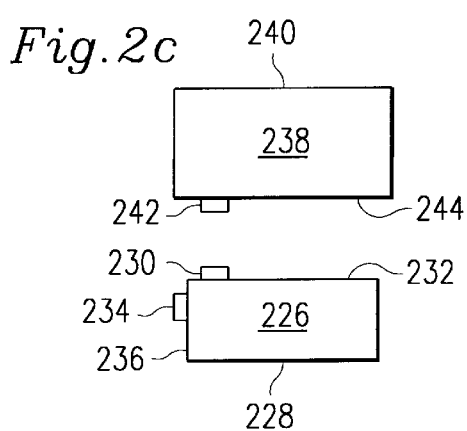

In a further example, notebook computer 226, FIG. 2c, is contained in a housing 228 and includes a first IR data port 230 mounted on a rear surface 232 of housing 228, and also includes a second IR data port 234 mounted on a side surface 236 of housing 228. Notebook computer 226 is mounted adjacent a projector 238 which includes a housing 240 and an IR port 242 mounted on a front surface 244 of housing 240. Front surface 244 of projector 238 is in close proximity to rear surface 232 of notebook computer 226 to permit IR signal communication between IR port 230 of notebook computer 226 and IR port 242 of projector 238.

Figure 2D:
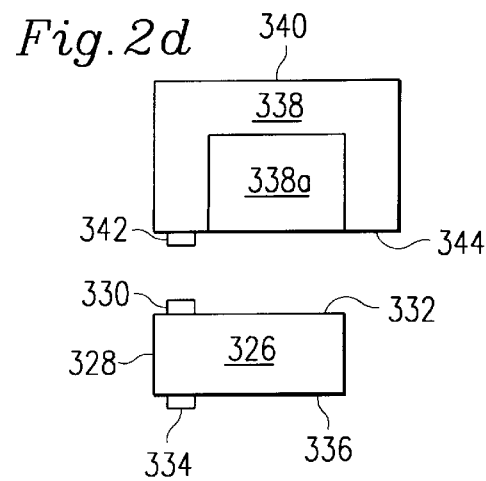

In a still further example, notebook computer 326, FIG. 2d, is contained in a housing 328 and includes a first IR data port 330 mounted on a rear surface 332 of housing 328, and also includes a second IR data port 334 mounted on a front surface 336 of housing 328. Notebook computer 326 is mounted adjacent a desktop computer 338 including a monitor 338a mounted thereon. Desktop computer 338 includes a housing 340 and an IR port 342 mounted on a front surface 344 of housing 340. Front surface 344 of desktop computer 338 is in close proximity to rear surface 332 of notebook computer 326 to permit IR signal communication between IR port 330 of notebook computer 326 and IR port 342 of desktop computer 338.

A flowchart illustrates the sequential steps in the program operation of the embodiment of FIG. 3. A user first presses an initiating key or an initiating key combination utilizing a function key at 402 to actuate an IR port detection and scanning program in a host portable computer. This generates a system management interrupt (SMI) at 404. The SMI could also be generated by another controller, i.e. a microcontroller situated within the computer. The computer cannot practically search without limitations such as disabling a serial port (not shown) from other uses, power source limitations, and time limitations. Therefore, an IR scan timer at 406, times the search for an external IR signal and the system BIOS at 408a activates a front IR transceiver at 410. If the front IR transceiver detects an external IR signal at 410, communication is established via the front IR transceiver at 412 until that communication is complete at 414. If however, the front IR transceiver does not detect an external IR signal at 410, the system BIOS at 408b activates a rear IR transceiver at 418 If the rear IR transceiver detects an external IR signal at 418, communication is established via the rear IR transceiver at 420 until that communication is complete at 422. If however, the rear IR transceiver does not detect an external IR signal at 418, the system checks to see if the allotted time set for the IR scan timer has expired at 424. If the scan timer has not expired, the system BIOS at 408a again activates the front IR transceiver at 410 and the cycle is repeated until time expires. If the IR scan timer at 424 has expired at 426, and no external IR signal is found, then the user can optionally choose at 428 not to continue, in which case the system exits the program at 430. If the user chooses at 428 to search again, the IR scan timer is reset at 406 and the cycle is repeated.

In the event that the front IR transceiver detects an external IR signal at 410 and communications is established via the front IR transceiver at 412, and that communication is interrupted or lost at 416, the IR scan timer is reset at 406. Similarly, in the event that the rear IR transceiver detects and external signal at 418 and communications is established via the rear IR transceiver at 420, and that communication is interrupted or lost at 416, the IR scan timer is reset at 406.

Figure 4:
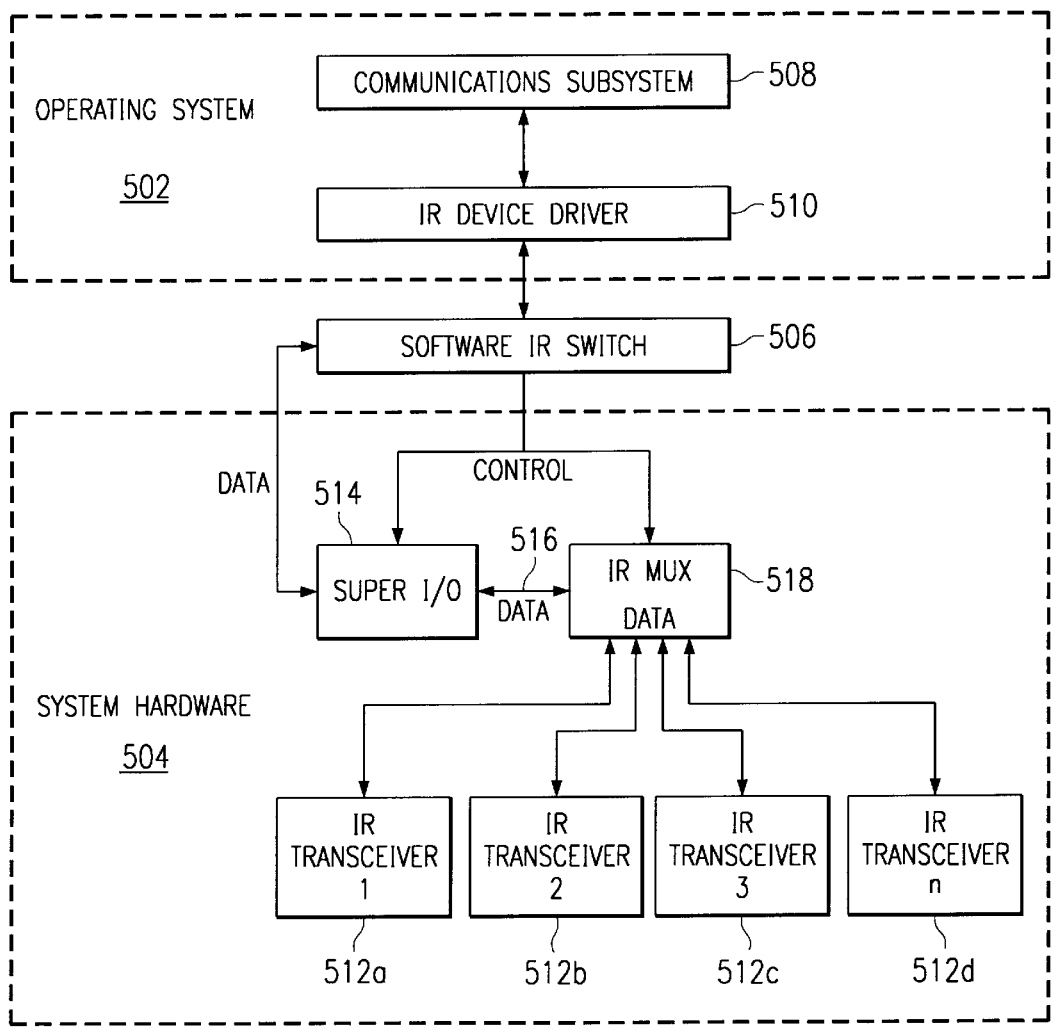
FIG. 4 is a diagrammatic view illustrating a block diagram illustrating the dual IR scanning apparatus and method.

The external IR signal search capability is part of the basic functionality of the system BIOS in the form of a chip (discussed below) which can be subsequently updated. In the block diagram illustrated in FIG. 4, an operating system 502 is linked to a system hardware 504 by a software IR switch 506 in the system BIOS. The operating system includes a communication subsystem 508 which communicates with an IR device driver 510 which begins to communicate with one of the IR transceiver 512a, 512b, 512c, or 512d in the system hardware 504. The software IR switch 506 begins the process of searching for an external IR signal via the transceivers 512a–d. When communication is established, the system locks on to the external IR signal until the communication is complete, whereupon the system shuts down.

The system hardware 504 includes a super I/O device, i.e. a chip 514 which includes a communications port 516 connected to the transceivers 512a–d via an IR multiplexer 518. In this manner, the system is directed to any of the transceivers 512a–d, or as in the embodiment of FIG. 3, to either a front IR transceiver or a rear IR transceiver.

As it can be seen, the principal advantages of these embodiments are that a plurality of IR data ports on a portable notebook computer can sequentially, automatically scan an external IR data port from an IR signal. The user is only required to locate one of the several ports adjacent the external IR data port. If an IR signal is being generated by the external data port, the IR data port on the portable computer which is adjacent the external IR data port, will eventually lock on to the external IR signal. Once the external IR signal is detected by a data port, communication is established and searching ceases.

As an alternative, the notebook computer could continuously scan the front and back IR port for an infrared signal. When the infrared signal is detected, the notebook computer would lock in on the appropriate port and establish communications. The user could be made aware that a connection had been established by bringing up an IR icon on the status panel. Parameters could be set by double-clicking on the icon. If power consumption is too high as a result of continuous scanning, an algorithm could turn off the scanning when the notebook computer is running on battery power.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automatic IR port detection device comprising:
   a portable computer including a first and a second transceiver data port;
   an IR port detection and scanning program in the portable computer actuated by an initiating key command;
   a controller in the portable computer generating a systems management interrupt in response to the initiating key command being actuated;
   an IR scan timer being initiated in response to the systems management interrupt being generated;
   a system BIOS in the computer for actuating the first transceiver data port to scan for an external IR signal, the system BIOS sequentially actuating the second transceiver data port to scan for the external IR signal in response to the absence of the external IR signal received by the first transceiver data port; and
   the IR scan timer being resettable in the absence of the IR signal being received by the second transceiver data port.

2. The device as defined in claim 1 wherein the key command is initiated by a single key.

3. The device as defined in claim 1 wherein the key command is initiated by a key combination.

4. The device as defined in claim 1 further comprising an operating system linked to a system hardware by a software IR switch in the system BIOS.

5. The device as defined in claim 4 wherein the operating system includes a communication subsystem coupled to communicate with an IR device driver.

6. The device as defined in claim 5 wherein the IR device driver is coupled to communicate with the transceivers, the software IR switch searches for the external IR signal via the transceivers and, in response to communication being established between one of the transceivers and the external IR signal, the device locks on to the external IR signal until communication is complete, whereby the device shuts down.

7. An automatic IR port detection device comprising:
   a portable computer including a first and a second transceiver data port;
   an external device adjacent the computer and including at least one external transceiver data port;
   an IR port detection and scanning program in the portable computer actuated by an initiating key command;
   a keyboard controller in the portable computer generating a systems management interrupt in response to the initiating key command being actuated;
   an IR scan timer being initiated in response to the systems management interrupt being generated;
   a systems BIOS in the computer for actuating the first transceiver data port to scan for an external IR signal, the system BIOS sequentially actuating the second transceiver data port to scan for the external IR signal in response to the absence of the external IR signal received by the first transceiver data port; and
   the IR scan timer being resettable in the absence of the IR signal being received from the external transceiver data port by either of the first and second transceiver data ports.

8. The device as defined in claim 7 wherein the key command is initiated by a single key.

9. The device as defined in claim 7 wherein the key command is initiated by a key combination.

10. The device as defined in claim 7 further comprising an operating system linked to a system hardware by a software IR switch in the system BIOS.

11. The device as defined in claim 10 wherein the operating system includes a communication subsystem coupled to communicate with an IR device driver.

12. The device as defined in claim 11 wherein the IR device driver is coupled to communicate with the transceivers, the software IR switch searches for the external IR signal via the transceivers and, in response to communication being established between one of the transceivers and the external IR signal, the device locks on to the external IR signal until communication is complete, whereby the device shuts down.

13. A computer system comprising:
   a microprocessor;
   an input coupled to provide input to the microprocessor;
   a mass storage coupled to the microprocessor;
   a display coupled to the microprocessor by a video controller;
   a memory coupled to provide storage to facilitate execution of computer programs by the microprocessor;
   a portable computer including a first and second transceiver data port;
   an IR port detection and scanning program in the portable computer actuated by an initiating key command;
   a micro-controller in the portable computer generating a systems management interrupt in response to the initiating key command being actuated;
   an IR scan timer being initiated in response to the systems management interrupt being generated;
   a system BIOS in the computer for actuating the first transceiver data port to scan for an external IR signal, the system BIOS sequentially actuating the second transceiver data port to scan for the external IR signal in response to the absence of the external IR signal received by the first transceiver data port; and
   the IR scan timer being resettable in the absence of the IR signal being received by the second transceiver data port.

14. The device as defined in claim 13 wherein the key command is initiated by a single key.

15. The device as defined in claim 13 wherein the key command is initiated by a key combination.

16. The device as defined in claim 13 further comprising an operating system linked to a system hardware by a software IR switch in the system BIOS.

17. The device as defined in claim 16 wherein the operating system includes a communication subsystem coupled to communicate with an IR device driver.

18. The device as defined in claim 17 wherein the IR device driver is coupled to communicate with the transceivers, the software IR switch searches for the external IR signal via the transceivers and, in response to communication being established between one of the transceivers and the external IR signal, the device locks on to the external IR signal until communication is complete, whereby the device shuts down.

19. A method of automatically detecting an external IR signal comprising the steps of:

providing at least a first and a second transceiver data port on a portable computer;

actuating an IR port detection and scanning program in the portable computer by an initiating key combination;

generating a systems management interrupt by means of a controller in the portable computer in response to the initiating key combination being actuated;

initiating an IR scan timer in response to the systems management interrupt being generated;

actuating the first transceiver data port by means of a system BIOS in the computer to scan for an external IR signal;

actuating the second transceiver data port by means of the system BIOS in the computer to scan for the external IR signal in response to the absence of the external IR signal received by the first transceiver data port; and resetting the IR scan timer in the absence of the IR signal being received by the second transceiver data port.

20. The method as defined in claim 19 further comprising the step of locking one of the transceiver data ports on to the external IR signal until communication therewith is complete.

* * * * *